US009165243B2

(12) United States Patent
Yu et al.

(10) Patent No.: US 9,165,243 B2
(45) Date of Patent: Oct. 20, 2015

(54) TENSOR DEEP STACKED NEURAL NETWORK

(75) Inventors: Dong Yu, Bothell, WA (US); Li Deng, Redmond, WA (US); Brian Hutchinson, Brier, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 291 days.

(21) Appl. No.: 13/397,580

(22) Filed: Feb. 15, 2012

(65) Prior Publication Data

US 2013/0212052 A1    Aug. 15, 2013

(51) Int. Cl.
*G06N 3/04*    (2006.01)
*G06N 3/08*    (2006.01)

(52) U.S. Cl.
CPC ... *G06N 3/04* (2013.01); *G06N 3/08* (2013.01)

(58) Field of Classification Search
None
See application file for complete search history.

(56) References Cited

U.S. PATENT DOCUMENTS

| | | | | |
|---|---|---|---|---|
| 5,033,006 | A * | 7/1991 | Ishizuka et al. | 706/25 |
| 5,598,509 | A | 1/1997 | Takahashi et al. | |
| 5,724,487 | A * | 3/1998 | Streit | 706/25 |
| 5,790,758 | A * | 8/1998 | Streit | 706/33 |
| 6,038,338 | A * | 3/2000 | Nguyen | 382/159 |
| 6,243,490 | B1 * | 6/2001 | Mita | 382/158 |
| 6,816,786 | B2 | 11/2004 | Intriligator et al. | |
| 2008/0221734 | A1 * | 9/2008 | Nagao et al. | 700/259 |
| 2009/0204558 | A1 | 8/2009 | Weston et al. | |
| 2011/0191274 | A1 | 8/2011 | Yu et al. | |
| 2012/0072215 | A1 | 3/2012 | Yu et al. | |
| 2013/0212052 | A1 | 8/2013 | Yu et al. | |

FOREIGN PATENT DOCUMENTS

WO         93/00655 A1      1/1993

OTHER PUBLICATIONS

Breiman, Leo; "Stacked Regression"; 1996; Kluwer academic Publishers, Boston; Machine Learning, 24; pp. 49-64.*
Hashem, Sherif; "Optimal Linear Combinations of Neural Networks"; 1997; Elsevier Science Ltd.; Neural Networks, vol. 10, No. 4; pp. 599-614.*
Rowley, Hentry A. et al.; "Neural Network-Based Face Detection"; 1998; IEEE; Transactions on pattern Analysis and Machine Intelligence, vol. 20, No. 1; pp. 23-38.*

(Continued)

*Primary Examiner* — Stanley K Hill
(74) *Attorney, Agent, or Firm* — Sandy Swain; Judy Yee; Micky Minhas

(57) ABSTRACT

A tensor deep stacked neural (T-DSN) network for obtaining predictions for discriminative modeling problems. The T-DSN network and method use bilinear modeling with a tensor representation to map a hidden layer to the predication layer. The T-DSN network is constructed by stacking blocks of a single hidden layer tensor neural network (SHLTNN) on top of each other. The single hidden layer for each block then is separated or divided into a plurality of two or more sections. In some embodiments, the hidden layer is separated into a first hidden layer section and a second hidden layer section. These multiple sections of the hidden layer are combined using a product operator to obtain an implicit hidden layer having a single section. In some embodiments the product operator is a Khatri-Rao product. A prediction is made using the implicit hidden layer and weights, and the output prediction layer is consequently obtained.

20 Claims, 5 Drawing Sheets

(56) References Cited

OTHER PUBLICATIONS

Ye, Yibin et al.; "Incremental-Based Extreme Learing Machine Algorithms for Time-Variant Neural Networks"; 2010; Springer-Verlag Berlin Heidelberg; ICIC 2010, LNCS 6215; pp. 9-16.*

Zhong, et al., "Bilinear Deep Learning for Image Classification", Retrieved at <<http://www4.comp.polyu.edu.hk/~csshzhong/ACMMM2011.pdf>>, Proceedings of the 19th International Conference on Multimedea, Nov. 28-Dec. 1, 2011, pp. 10.

Weston, et al., "Deep Learning via Semi-Supervised Embedding", Retrieved at <<http://www.thespermwhale.com/jaseweston/papers/deep_embed.pdf>>, Machine Learning, Proceedings of the Twenty-Fifth International Conference (ICML), Jun. 5-9, 2008, pp. 8.

Bastien, et al., "Deep Self-Taught Learning for Handwritten Character Recognition", Retrieved at <<http://arxiv.org/PS_cache/arxiv/pdf/1009/1009.3589v1.pdf>>, Computer Vision and Pattern Recognition, Neural and Evolutionary Computing, Sep. 17, 2010, pp. 1-9.

Deselaers, et al., "A Deep Learning Approach to Machine Transliteration", Retrieved at <<http://aclweb.org/anthology/W/W09/W09-0438.pdf>>, In Proceedings EACL Workshop on Statistical Machine Translation (WMT), Mar. 2009, pp. 233-241.

Bengio, Yoshua., "Learning Deep Architectures for AI", Retrieved at <<http://www.iro.umontreal.ca/~bengioy/papers/ftml_book.pdf>>, Foundations and Trends in Machine Learning, vol. 2, No. 1, Jan. 2009, pp. 130.

Deng, et al., "Deep Convex Net: A Scalable Architecture for Speech Pattern Classification", Retrieved at <<http://research.microsoft.com/pubs/152133/DeepConvexNetwork-Interspeech2011-pub.pdf>>, Interspeech, 12th Annual Conference of the International Speech Communication Association, Aug. 27 - 31, 2011, pp. 2285-2288.

Deng, et al., "Deep convex networks for image and speech classification", Retrieved at <<http://icml2011speechvision.files.wordpress.com/2011/07/dengyu-workshop-icml2011.pdf>>, ICML 2011 Workshop on Learning Architectures, Representations, and Optimization for Speech and Visual Information Processing, Jun. 2011, pp. 6.

Wolpert, David H., "Stacked generalization", Retrieved at <<http://citeseer.ist.psu.edu/viewdoc/summary?doi=10.1.1.133.8090>>, Neural Networks, vol. 5, 1992, pp. 1-57.

Dahl, et al., "Context-dependent pre-trained deep neural networks for large vocabulary speech recognition", Retrieved at <<http://research.microsoft.com/pubs/144412/DBN4LVCSR-TransASLP.pdf>>, IEEE Transactions on Audio, Speech, and Language Processing, vol. 20, No. 1, Jan. 2012, pp. 1-13.

Yu, et al, "Accelerated parallelizable neural network learning algorithm for speech recognition", Retrieved at <<http://research.microsoft.com/pubs/152134/SingleLayer4ASR-Interspeech2011-pub.pdf>>, INTERSPEECH, 12th Annual Conference of the International Speech Communication Association, Aug. 27-31, 2011, pp. 2281-2284.

Kolda, et al., "Tensor decompositions and applications", Retrieved at <<http://citeseerx.ist.psu.edu/viewdoc/summary?doi=10.1.1.130.782>>, SIAM Review, vol. 51, No. 3, Sep. 2009, pp. 1-71.

Dunlavy, et al., "Poblano v1.0: A matlab toolbox for gradient-based optimization", Retrieved at <<http://www.sandia.gov/~dmdunla/publications/SAND2010-1422.pdf>>, Sandia National Laboratories, SAND2010-1422, Mar. 2010, pp. 38.

Mohamed, et al., "Investigation of full-sequence training of deep belief networks for speech recognition", Retrieved at <<http://research.microsoft.com/pubs/135406/MMI-DBN-interspeech2010.pdf>>, INTERSPEECH, 11th Annual Conference of the International Speech Communication Association, Sep. 26-30, 2010, pp. 2846-2849.

Dahl, et al., "Phone recognition with the mean-covariance restricted boltzmann machine", Retrieved at <<http://www.cs.utoronto.ca/~hinton/absps/mcphone.pdf>>, Advances in Neural Information Processing, 2010, pp. 1-9.

Seide, et al., "Conversational speech transcription using context-dependent deep neural networks", Retrieved at <<http://research.microsoft.com/pubs/153169/CD-DNN-HMM-SWB-Interspeech2011-Pub.pdf>>, INTERSPEECH, 12th Annual Conference of the International Speech Communication Association, Aug. 27-31, 2011, pp. 437-440.

"International Search Report & Written Opinion for PCT Patent Application No. PCT/US2013/055898", Mailed Date: Feb. 10, 2014, Filed Date: Aug. 21, 2013, 11 pages.

Hutchinson, et al., "A Deep Architecture with Bilinear Modeling of Hidden Representations: Applications to Phonetic Recognition", In IEEE International Conference on Acoustics, Speech and Signal Processing, Mar. 25, 2012, pp. 4805-4808.

* cited by examiner

TENSOR DEEP STACKED NEURAL NETWORK

BACKGROUND

A neural network is a powerful discriminative modeling tool. Neural networks can be used to solve problems of prediction, classification, structured recognition, and time series analysis, just to name a few. Neural networks are applicable in situations where a relationship between the predictor variables (inputs) and the predicted variables (outputs) exists, even when that relationship is complex and temporally varying.

One type of neural network is a deep neural network (DNN), which contains many layers that are built one upon the other. Each higher layer receives as input the output from the immediate lower layer. However, it is quite difficult to parallelize the prevailing training algorithms of such networks because of the challenge of spreading the large model out over multiple machines for each minibatch. This leads to a lack of scalability and parallelization in the learning algorithms for the DNN architecture.

In an effort to overcome these obstacles, a Deep Convex Network, or Deep Stacking Network (DSN) was developed. The DSN architecture is different from a normal neural network. It is a deep classification architecture that is built on blocks of single hidden layer neural networks (or SHLNN). The DSN architecture allows one to perform unsupervised learning on the bottom layers and supervised learning at the top layers. It is thus possible to develop more efficient, batch-mode, parallelizable learning algorithms for DSNs.

To further simplify the learning process, each building block of the DSN can have a non-linear hidden layer and a linear output (also called prediction) layer, rather than two non-linear layers. Because of this simplification, the connection between the hidden layer and the output layer can be determined using a closed-form solution and the connection between the input layer and the hidden layer can be estimated more effectively using a batch-mode algorithm that is easier to parallelize.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the tensor deep stacked neural network and method maps from an input layer in the network to a prediction layer. This prediction can be used in classification problems and other types of discriminative modeling scenarios. Bilinear modeling with a tensor representation is used to map the hidden layer to the prediction layer.

Embodiments of the tensor deep stacked neural network and method improves and extend the architecture of the deep stacked neural network (DSN) in several ways. First, the information about higher-order statistics in the data, which is not represented in the DSN network, is now embedded into embodiments of the T-DSN network using the a bilinear model with a tensor representation of three-way interactions of the network weights. Second, while embodiments of the T-DSN network retains the same linear/nonlinear interleaving structure as the DSN network in building up the deep architecture, it shifts the major computational cost of the DSN network in the learning algorithm from the non-convex optimization component to the convex one with a closed-form solution. Embodiments of the T-DSN network and method also are amenable to parallel implementation in CPU clusters.

In particular, embodiments of the tensor deep stacked neural (T-DSN) network and method construct the T-DSN network by stacking blocks of a single hidden layer tensor neural network (SHLTNN) on top of each other. Input data for each block are mapped to a plurality of section (or multiple sections) in the hidden layer. In some embodiments, the hidden layer is separated into two sections. Namely, the first hidden layer section and the second hidden layer section.

Next, the multiple hidden layer sections are combined and mapped to form an implicit hidden layer using some operators. In some embodiments the operator is the Khatri-Rao product. A prediction then is made based on the implicit hidden layer and the weights between the implicit hidden layer and the prediction layer. This process is repeated for each block.

In some embodiments of the T-DSN network and method, the first hidden layer section and the second hidden layer section are directly mapped to the prediction layer through a bilinear mapping with a tensor representation. In other words, the bilinear (or two linear) transformation (or mapping) maps from the two hidden layer sections to the single prediction layer. Using a bilinear model captures second-order features and thus allows for better predictions to be made.

It should be noted that alternative embodiments are possible, and steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

DETAILED DESCRIPTION

Figure 1:
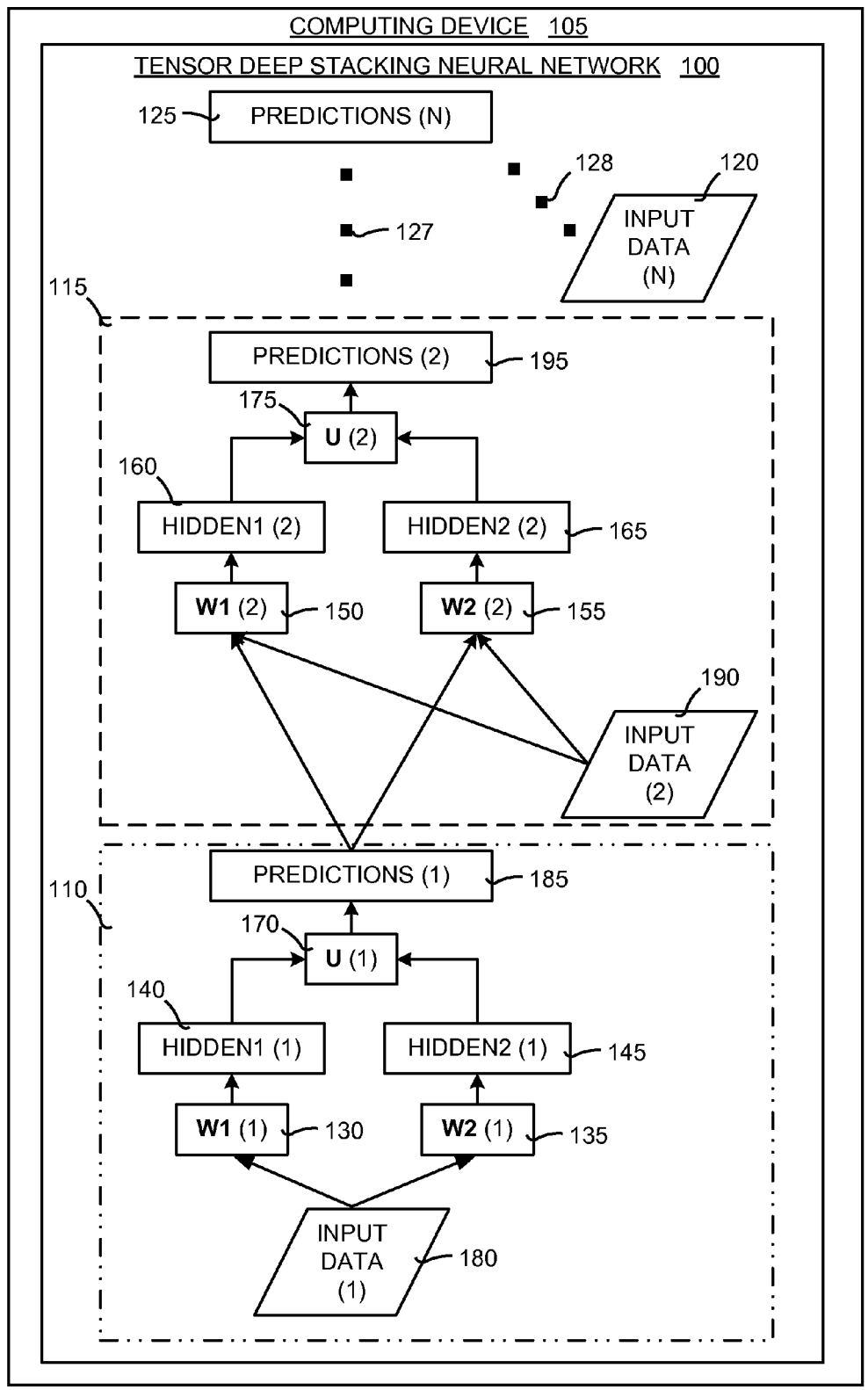
FIG. 1 is a block diagram illustrating a general overview of embodiments of a tensor deep stacking neural network and method implemented in a computing environment.

In the following description of embodiments of a tensor deep stacking neural network and method reference is made to the accompanying drawings, which form a part thereof, and in which is shown by way of illustration a specific example whereby embodiments of the tensor deep stacking neural network and method may be practiced. It is to be understood that other embodiments may be utilized and structural changes may be made without departing from the scope of the claimed subject matter.

I. Overview of the Deep Stacking Neural Network (DSN)

Before discussing the tensor deep stacking neural network and method in detail it is instructive to provide an overview of the deep stacking neural network. The deep stacking neural network (DSN) is a scalable deep architecture amenable to parallel weight learning. The DSN is trained in a supervised, block-wise fashion, without the need for back-propagation over all blocks. The DSN blocks are stacked to form the overall deep network.

Each DSN block is a single hidden layer neural network (SHLNN). It has an upper-layer weight matrix U that connects a sigmoidal nonlinear hidden layer H to the linear output layer Y, and a lower-layer weight matrix W that links the input and hidden layers. The target vector is designated as T. If it is assumed that the lower-layer weights W are known the learning of the upper-layer weight matrix U can be formulated as a convex optimization problem and has a closed-form solution, given mathematically as:

$$U^T = TH^\dagger, \quad (1)$$

where, $$H^\dagger = H^T(HH^T)^{-1}, H = \sigma(W^T X), \quad (2)$$

and X is the data matrix, whose columns are the input vectors to the SHLNN. In the lowest block, X contains only the raw input data, while in higher blocks the input data may be concatenated with one or more output representations from the previous blocks. The lower-layer weight matrix W can be estimated using an accelerated gradient descent algorithm to minimize the mean square error, given by:

$$f = \|U^T H - Y\|_F.$$

Embedding the solution of Equation (1) into the objective and computing the gradient, yields:

$$\nabla_{wf} = 2X[H^T \bigcirc (1-H^T) \bigcirc [H^\dagger(HT^T)(TH^\dagger) - T^T(TH^\dagger)]], \quad (3)$$

where 1 is the matrix of all ones.

II. Tensor Deep Stacked Neural Network (T-DSN) Architecture

Embodiments of the tensor deep stacked neural network (T-DSN) and method use some elements of the DSN network and carry the same advantages. In addition, embodiments of the T-DSN network use a hidden layer for each block except that the hidden layer is broken into multiple sections. In some embodiments the hidden layer is separated into two sections. These two sections jointly predict the output. For example, if each part in the hidden layer has 100 neurons a product combination of these two sections would yield thousands of implicit neurons to predict the output layer. Embodiments of the T-DSN network and method can be used for any type of classification problem, such as handwriting recognition, speech recognition, object recognition, image recognition, and so forth.

FIG. 1 is a block diagram illustrating a general overview of embodiments of a tensor deep stacking neural network 100 and method implemented in a computing environment. It should be noted that FIG. 1 is merely one of several possible embodiments in which the T-DSN network 100 and method may be implemented. In particular, embodiments of the T-DSN network 100 and method are implemented on a computing device 105. This computing device 105 may be virtually any device that contains a processor, such as a desktop computer, notebook computer, and mobile phone.

In FIG. 1 are shown the modular architecture of embodiments of the T-DSN network 100 and method. FIG. 1 illustrates two complete blocks of embodiments of the network and method stacked one upon the other. Each of these blocks is a single hidden layer tensor neural network (SHLTNN). A first block 110 is shown surrounded by an alternating dotted-dashed line, while a second block 115 is shown surrounded by a dashed line.

The stacking operation of embodiments of the T-DSN network 100 and method is the same as that of the DSN network. This stacking of blocks is shown in FIG. 1 as the second block 115 stacked upon the first block 110. Note that the first block 110 and the second block 115 are complete blocks. In addition, FIG. 1 illustrates additional blocks stacked upon the second block 115. In total there are N blocks, where N is a number greater or equal to two. These additional blocks are represented by input data (N) 120, predictions (N) 125, and a first ellipsis 127 and a second ellipsis 128. The first ellipsis 127 and the second ellipsis 128 are meant to indicate that there are additional blocks stacked upon the second block 115.

Each block in embodiments of the T-DSN network 100 and method contains two sets of lower-layer weight matrices, designated as W1 and W2. These lower-layer weights, which are unique to the T-DSN network, connect the input layer with two parallel sigmoidal hidden layer sections "Hidden 1" and "Hidden 2." In the first block 110, the lower-layer weights are designated as W1(1) 130 and W2(1) 135 and the hidden layer sections are designated as Hidden1(1) 140 and Hiddenc2(1) 145. In the second block 115, the lower-layer weights are designated as W2(1) 150 and W2(2) 155 and the hidden layers are designated as Hidden1(2) 160 and Hidden2(2) 165. Note that although two hidden layers are shown in FIG. 1, the hidden layer may be separated into multiple sections greater than two.

Each block also contains a three-way weight tensor U that connects the two parallel hidden layer sections with the output layer. In the first block 110 the three-way tensor weight is designated as U(1) 170 and in the second block 115 is designated as U(2) 175. For the first block 110, input data(1) 180 is input to embodiments of the network 100 and method and then is processed to obtain predictions(1) 185. For the second block 115, input data(2) 190 is input to the second block 115 and then is processed to obtain predictions(2) 195.

Note that if embodiments of the T-DSN network 100 and method are used for regression or for classification, then the basic architecture shown in FIG. 1 suffices. However, if embodiments of the network and method are to be interfaced with an hidden Markov model (HMM) for structured prediction (such as continuous phonetic or word recognition), then it is desirable to convert the final output in FIG. 1 into posterior probabilities via an additional softmax layer that is added to the top of the blocks shown in FIG. 1.

Figure 2:
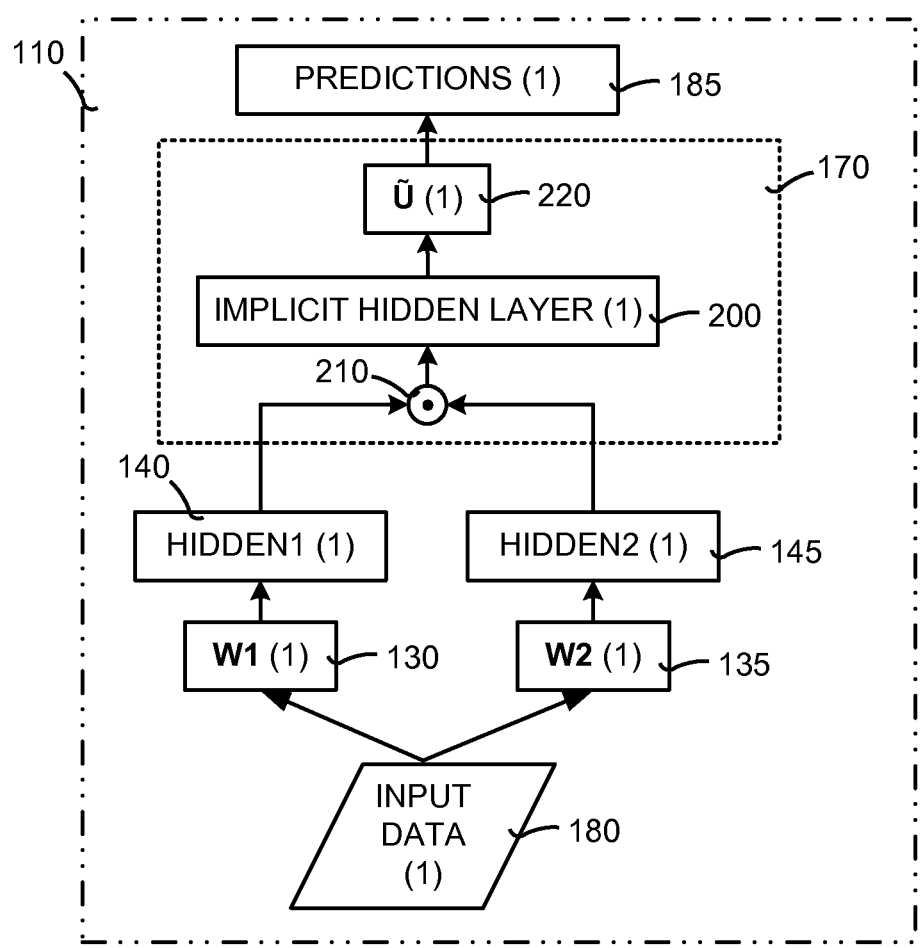
FIG. 2 is a block diagram illustrating a detailed view of embodiments of the hidden layer sections and the upper layer weights of a single block of the tensor deep stacking neural network and method shown in FIG. 1.

FIG. 2 is a block diagram illustrating a detailed view of embodiments of the hidden layer sections and the upper layer weights of the first block 110 of the tensor deep stacking neural network 100 and method shown in FIG. 1. In each block, bilinear mapping with a tensor representation is used to map from parallel hidden layer sections to an output prediction. This bilinear mapping allows the incorporation of higher-order statistics of the extracted features.

In the embodiment shown in FIG. 2, the first block contains input data(1) 180 that is fed to a hidden layer that has been separated into two hidden sections, namely Hidden1 (1) 140 and Hidden2 (1) 145. Each of the hidden layer section has lower-layer weight, namely W1 (1), 130 corresponding to Hidden1 (1) 140, and W2 (1) 135, corresponding to Hidden2 (1) 145.

FIG. 2 shows a different view of the T-DSN network 100. In particular, the hidden layer sections, Hidden1 (1) 140 and Hidden 2 (1) 145, can be combined into a single implicit normal hidden layer 200 to be used to predict the outputs. As explained in detail below, this combining is accomplished in part by using the Khatri-Rao product, as shown in FIG. 2 by the K-R symbol, ⊙ 210. As is known by those having ordinary skill in the art, the Khatri-Rao product is a columnwise Kronecker product and achieves the effect of multiplying all pairs of values within each column. In some embodiments, the three-way tensor weight U(1) 170 can thus be converted into a weight matrix, Ũ(1) 220. This tensor weight matrix 220 is explained in detail below.

III. Operational Overview

Figure 3:
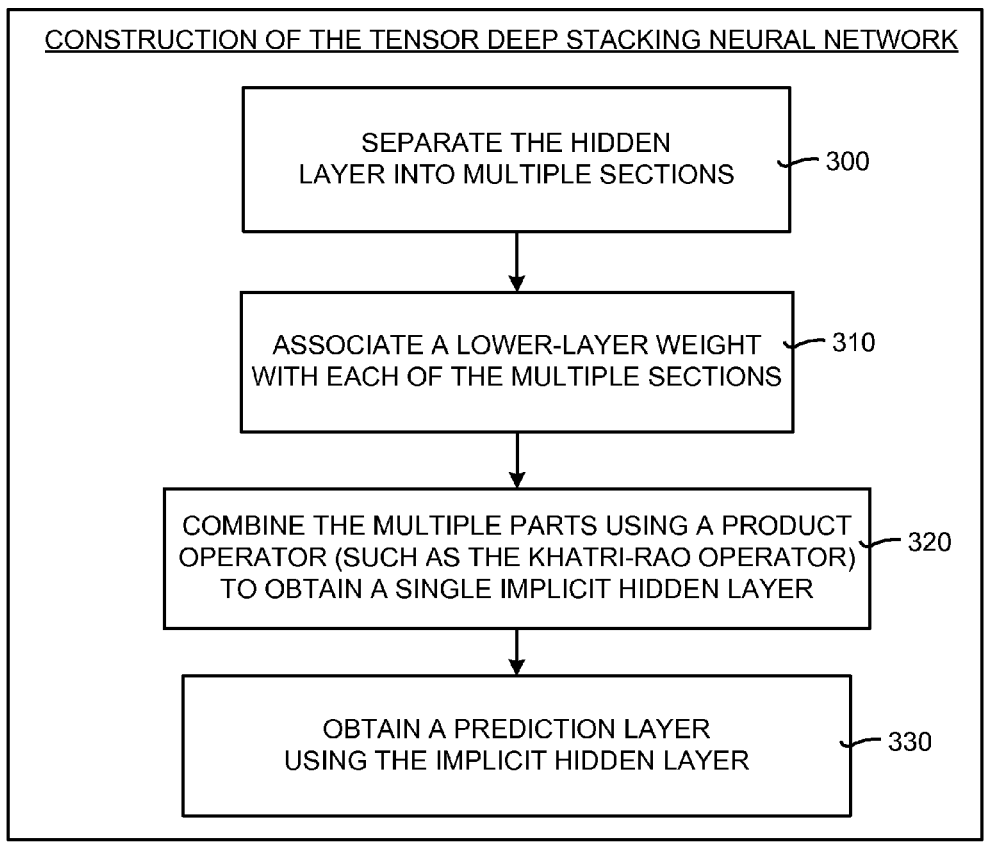
FIG. 3 is a flow diagram illustrating the general operation of embodiments of the tensor deep stacked neural network and method shown in FIGS. 1 and 2.

FIG. 3 is a flow diagram illustrating the general operation of embodiments of the tensor deep stacked neural network and method shown in FIGS. 1 and 2. In general, embodiments of the tensor deep stacked neural network use multiple blocks of a single hidden layer tensor neural network (SHLTNN) stacked on top of each other and a multiple hidden layer sections that are bilinearly mapped into a single implicit hidden layer to obtain a prediction for that block.

Specifically, as shown in FIG. 3, the operation of embodiments of the tensor deep stack neural network method begins by separating the hidden layer of each block into a plurality of sections (or multiple sections) (box 300). The method then associates a lower-layer weight with each of the multiple sections (box 310). These multiple sections then are combined using a product operator (box 320). In some embodiments the product operator is the Khatri-Rao product. Moreover, the multiple sections are combined to obtain a single implicit hidden layer. A prediction layer is obtained by using the implicit hidden layer (box 330).

IV. Operational Details

The system and operational details of embodiments of the tensor deep stacked neural network 100 and method will now be discussed. This includes the operation and mathematical details of the three-way tensor weight, U(1) 170.

Figure 4:
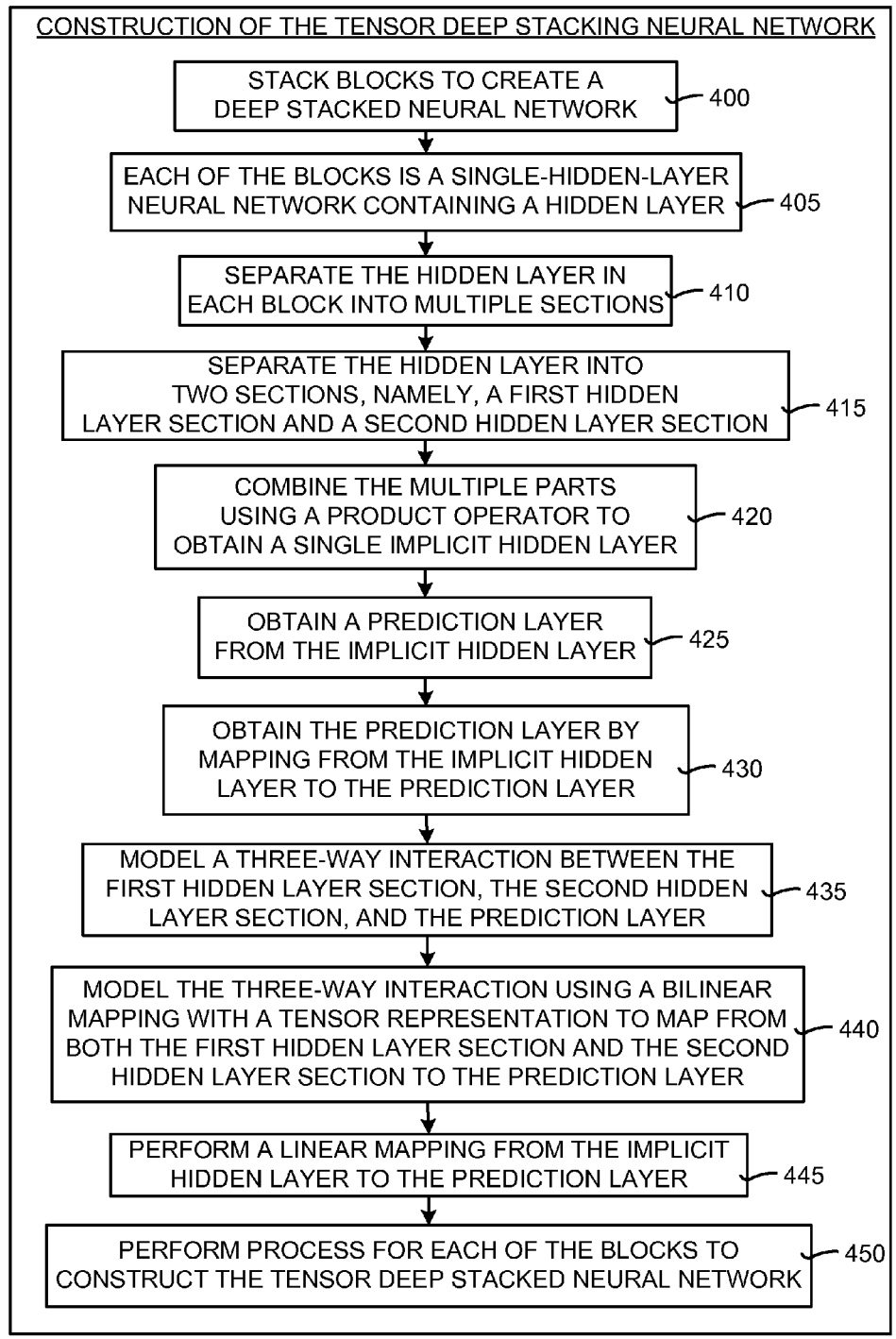
FIG. 4 is a flow diagram illustrating the details of the operation of embodiments of the tensor deep stacked neural network shown in FIGS. 1, 2, and 3.

FIG. 4 is a flow diagram illustrating the details of the operation of embodiments of the tensor deep stacked neural network 100 shown in FIGS. 1, 2, and 3. The operation begins by stacking blocks to create a deep stacked neural network (box 400). Each of the blocks is a single-hidden-layer tensor neural network (SHLTNN) that contains a single hidden layer (box 405). Next, the hidden layer in each block is separated into multiple sections (box 410). In some embodiments, the number of multiple sections is two, such that there is a first hidden layer section and a second hidden layer section (box 415).

In addition to the hidden layer being divided into multiple sections, each of the multiple sections also contains a lower-layer weight. The multiple sections then are combined (such as through the Khatri-Rao product) to obtain a single implicit hidden layer (box 420). A prediction layer then is obtained from the implicit hidden layer (box 425). In some embodiments, the prediction layer is obtained from the hidden layer by performing a mapping from the implicit hidden layer to the prediction layer (box 430).

For the embodiments where the hidden layer is divided into two sections, this mapping is a modeling of a three-way interaction between the first hidden layer section, the second hidden layer section, and the prediction layer (box 435). In some embodiments, this modeling is performed using a bilinear mapping with a tensor representation to map from the first and second hidden layer sections to the prediction layer (box 440).

Moreover, a linear mapping is performed from the implicit hidden layer to the prediction layer (box 445). The above process is performed for each of the blocks (box 450). In this manner, the tensor deep stacked neural network is constructed.

IV.A. Bilinear Predictions from Two Parallel Hidden Layer Sections

As noted above, one aspect of embodiments of the tensor deep stacking neural network 100 and method is modeling three-way interactions among the two (or more) parallel hidden layer sections and the output prediction layer in each block. Mathematically, in place of the DSN network's linear mapping from the hidden units h to the output units y, embodiments of the tensor deep stacking neural network and method use a bilinear relationship from two hidden representations, $h_{(1)}$ and $h_{(2)}$.

The upper layer is thus parameterized by a weight tensor, u. Formally, the predictions y from embodiments of the tensor deep stacking neural network are defined as:

$$y = \begin{bmatrix} h_{(1)}^T U_1 h_{(2)} \\ \vdots \\ h_{(1)}^T U_C h_{(2)} \end{bmatrix}, \text{ where } h_{(j)} = \sigma(W_{(j)}^T x)^T \quad (4)$$

and $$U_k \in \mathbb{R}^{L_1 \times L_2}$$

are class-dependent matrix slices of the tensor u.

The connection to the DSN can be illuminated by some changes in notation. First, it should be noted that $$h_{(1)}^T U_k h_{(2)} = \sum_{i=1}^{L_1} \sum_{j=1}^{L_2} u_{kij} h_{(1)i} h_{(2)j}.$$

In other words, it is a weighted sum of all pairs of products between elements of $h_{(1)}$ and $h_{(2)}$. If, $$\tilde{h} \in \mathbb{R}^{L_1 L_2}$$

denotes a vector containing all pairs of products between $h_{(1)}$ and $h_{(2)}$, and $\tilde{u}_k$ is the vector of corresponding weights, then $$h_{(1)}^T U_k h_{(2)} = \tilde{u}_k^T \tilde{h}$$

Stacking the $\tilde{u}_k$ into a matrix, $$\tilde{U} = [\tilde{u}_1 \tilde{u}_2 \ldots \tilde{u}_c],$$

and the $\tilde{h}_n$ for each data point into a matrix, $$\tilde{H} = [\tilde{h}_1 \tilde{h}_2 \ldots \tilde{h}_N],$$

it follows that $$y = \tilde{U} \tilde{h}$$

and, in matrix form, that $$Y = \tilde{U} \tilde{h}$$

This leads to the same prediction equation as in DSN, but with a transformed hidden representation ĥ that contains multiplicative interactions between $h_{(1)}$ and $h_{(2)}$, permitting second-order statistics of the input data to be included in an abstract and parsimonious manner. FIG. 2 illustrates an equivalent architecture of the bottom block in FIG. 1, illustrating how the two hidden layers are expanded into an implicit hidden layer with all pairwise products.

The relationship between the matrices of explicit (low-dimensional) hidden units, $$\hat{H}_{(i)} = \sigma(W_{(i)}^T X),$$

and matrix of implicit (high-dimensional) hidden units $\tilde{H}$, is given by, $$\tilde{H} = H_{(1)} \odot H_{(2)}.$$

As noted above, the symbol, $\odot$, denotes the Khatri-Rao product. The Khatri-Rao product is a columnwise Kronecker product and achieves the effect of multiplying all pairs of values within each column.

IV.B. Details of the Tensor Weight Matrix

Due to the equivalence of the architectures shown in FIG. 2 and FIG. 1, learning the tensor weight matrix, $\tilde{U}$, which is the unfolded representation of tensor u, given the implicit hidden layer's output becomes the same as that in DSN. Since the implicit hidden layer's output is a deterministic function of the lower-layer weight matrices, embodiments of the tensor deep stacking neural network 100 and method only determine $W_{(1)}$ and $W_{(2)}$ to train a T-DSN block.

To train a block of embodiments of the tensor deep stacking neural network 100 and method using first order methods, the gradients of the mean square error objective function are computed with respect to $W_{(1)}$ and $W_{(2)}$. These gradients have a similar form to that of the DSN in Equation (3), but are modified to account for the Khatri-Rao product. Using the fact that $$\partial(H_{(1)} \odot H_{(2)}) = (\partial H_{(1)}) \odot H_{(2)} + H_{(1)} \odot (\partial H_{(2)}),$$

and letting $\Theta$ denote, $$\tilde{H}^\dagger(\tilde{H}T^T)(T\tilde{H}^\dagger) - T^T(T\tilde{H}^\dagger)$$

the DCN derivation can be modified to obtain the following gradients, $$\nabla_{W_1} f = 2X[H_{(1)}^T \odot (1 - H_{(1)}^T) \odot \Psi_{(1)}], \quad (5)$$

$$\nabla_{W_2} f = 2X[H_{(2)}^T \odot (1 - H_{(2)}^T) \odot \Psi_{(2)}], \quad (6)$$

where, $$\Psi_{(1)ij} = \sum_{k=1}^{L_2} h_{(2)kj} \Theta_{((i-1)L_2+k),j}$$

and $$\Psi_{(2)ij} = \sum_{k=1}^{L_1} h_{(1)kj} \Theta_{((k-1)L+i),j}.$$

The $\Psi$ matrices have the effect of bridging the high dimensional representation of $\Theta$ and the low dimensional representation in $H_{(i)}$, and are a result of the Khatri-Rao product. In contrast, the DSN has only a single hidden representation $H_{(1)}$, which is the same dimension as $\hat{H}$ so $\Theta$ is used directly in place of $\Psi$. Using the above gradients, embodiments of the tensor deep stacking neural network 100 and method optimize the objective via the L-BFGS method using the Poblano optimization toolbox or other optimization algorithms. Typically, a block in embodiments of the tensor deep stacking neural network 100 and method can be trained in 15 iterations, with up to 5 line-search function evaluations per iteration. Weight matrices $W_{(1)}$ and $W_{(2)}$ are initialized with random values in the range $[-1, 1]$.

From Equations (5) and (6), it can be seen that the bulk of the gradient computation is in matrix operations, including matrix multiplies and element-wise matrix products. In order to speed computation and to reduce the memory requirements, embodiments of the tensor deep stacking neural network 100 and method parallelize these matrix operations to run on a CPU cluster. The ability to parallelize training in this manner is a key reason for the scalability of training of embodiments of the tensor deep stacking neural network 100 and method.

IV.C. Differences Between T-DSN and DSN Networks

Embodiments of the tensor deep stacked neural network (T-DSN) 100 can be reduced to a deep stacked neural network (DSN) by forcing one of the two parallel hidden unit sets in each T-DSN block to have size one. Although the DSN network can be considered as a special extremely asymmetrical case of T-DSN, it has been found that the more symmetric the number of hidden units in the T-DSN, then the better the classification performance. The key advantage of the non-degenerated T-DSN (in other words, roughly equal number of hidden units in each set) over the degenerated one (in other words, DSN) is the ability to capture higher-order feature interactions or correlations.

Also, since the T-DSN typically has only 50 to 100 units in each of the two sets, which is substantially smaller than the size of the hidden layer in a DSN, with a typical number of 3000, the parameter balance is drastically shifted from the lower-layer weights toward the upper-layer weights. The upper-layer weights are much easier to optimize due to the closed-form solution. Moreover, the significantly smaller hidden representation sizes in T-DSN networks have the further advantage of bottlenecking the data.

This bottlenecking of the data aids the "stackability" in the deep architecture by providing the stacking flexibility. More specifically, one can not only concatenate the raw data with the module's prediction, but also concatenate raw data with h(1) and h(2) (or even concatenate all these three sets), without dramatically increasing the input dimension in the higher-level blocks.

V. Exemplary Operating Environment

Figure 5:
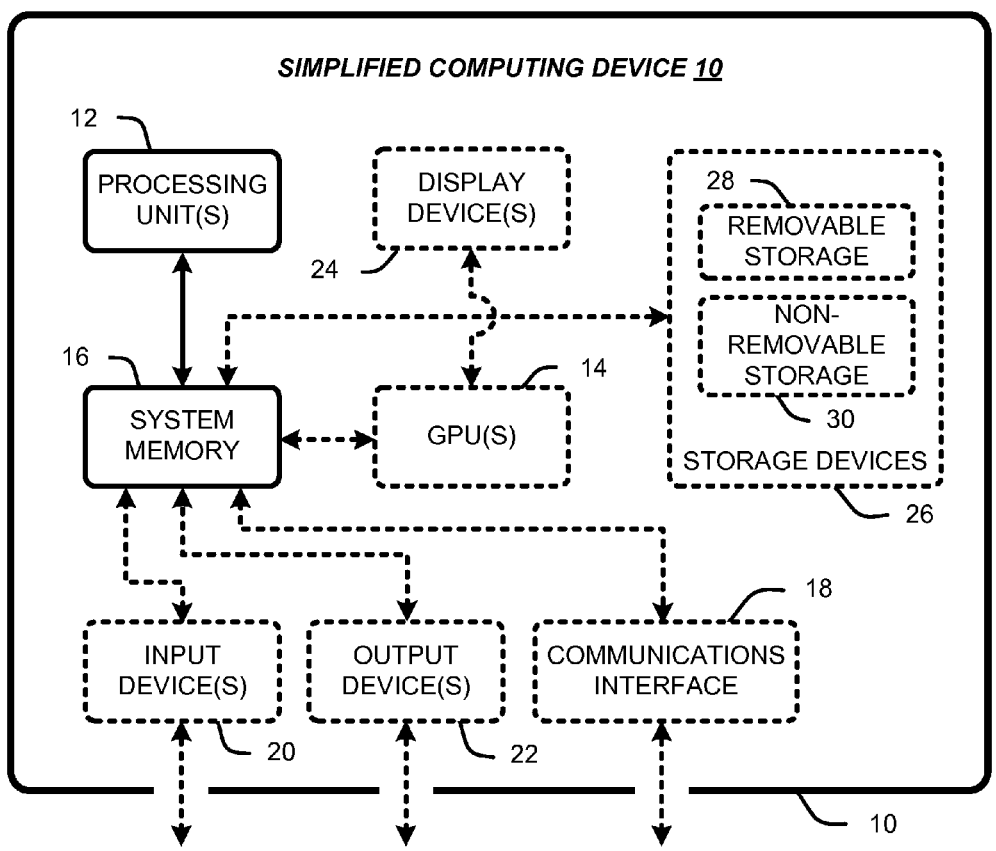
FIG. 5 illustrates a simplified example of a general-purpose computer system on which various embodiments and elements of the tensor deep stacked neural network and method, as described herein and shown in FIGS. 1-4, may be implemented.

Embodiments of the embodiments of the tensor deep stacked neural network 100 and method described herein are operational within numerous types of general purpose or special purpose computing system environments or configurations. FIG. 5 illustrates a simplified example of a general-purpose computer system on which various embodiments and elements of the tensor deep stacked neural network and method, as described herein and shown in FIGS. 1-4, may be implemented. It should be noted that any boxes that are represented by broken or dashed lines in FIG. 5 represent alternate embodiments of the simplified computing device, and that any or all of these alternate embodiments, as described below, may be used in combination with other alternate embodiments that are described throughout this document.

For example, FIG. 5 shows a general system diagram showing a simplified computing device 10. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, mini-computers, mainframe computers, audio or video media players, etc.

To allow a device to implement embodiments of the tensor deep stacked neural network 100 and method described herein, the device should have a sufficient computational capability and system memory to enable basic computational operations. In particular, as illustrated by FIG. 5, the computational capability is generally illustrated by one or more processing unit(s) 12, and may also include one or more GPUs 14, either or both in communication with system memory 16. Note that that the processing unit(s) 12 of the general computing device of may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 5 may also include other components, such as, for example, a communications interface 18. The simplified computing device of FIG. 5 may also include one or more conventional computer input devices 20 (e.g., pointing devices, keyboards, audio input devices, video input devices, haptic input devices, devices for receiving wired or wireless data transmissions, etc.). The simplified computing device of FIG. 5 may also include other optional components, such as, for example, one or more conventional computer output devices 22 (e.g., display device(s) 24, audio output devices, video output devices, devices for transmitting wired or wireless data transmissions, etc.). Note that typical communications interfaces 18, input devices 20, output devices 22, and storage devices 26 for general-purpose computers are well known to those skilled in the art, and will not be described in detail herein.

The simplified computing device of FIG. 5 may also include a variety of computer readable media. Computer readable media can be any available media that can be accessed by computer 10 via storage devices 26 and includes both volatile and nonvolatile media that is either removable 28 and/or non-removable 30, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Retention of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the tensor deep stacked neural network 100 and method described herein, or portions thereof, may be stored, received, transmitted, or read from any desired combination of computer or machine readable media or storage devices and communication media in the form of computer executable instructions or other data structures.

Finally, embodiments of the tensor deep stacked neural network 100 and method described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

Moreover, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device comprising:
   a processor; and
   memory that comprises a tensor deep stacked neural network (T-DSN), wherein the T-DSN comprises:
      a hidden layer that comprises:
         a first set of hidden units that comprises a first plurality of hidden units; and
         a second set of hidden units that comprises a second plurality of hidden units;
      an output layer that comprises a plurality of output units;
      a weight tensor that maps the hidden layer to the output layer, the tensor defines respective weights between:
         a product of each pair of hidden units formed between the first plurality of hidden units and the second plurality of hidden units, such that each pair of hidden units comprises a hidden unit in the first plurality of hidden units and a hidden unit in the second plurality of hidden units; and
      each output unit in the output units, wherein outputs at the output units are based upon the respective weights defined by the weight tensor and input data, and wherein the computing device is further configured to perform a classification task based upon the outputs at the output units.

2. The computing device of claim 1, the T-DSN further comprises:
   an input layer that represents the input data as a vector, the vector comprises entries; and
   at least one weight matrix that maps the input layer to the hidden layer.

3. The computing device of claim 2, the at least one matrix comprises:
   a first weight matrix that maps the entries of the vector to the first plurality of hidden units; and
   a second weight matrix that maps the entries of the vector to the second plurality of hidden units.

4. The computing device of claim 3, the first weight matrix defines a respective weight between each entry of the vector and each hidden unit in the first plurality of hidden units, and the second weight matrix defines a respective weight between each entry of the vector and each hidden unit in the second plurality of hidden units.

5. The computing device of claim 1, the T-DSN further comprises:
a second output layer that comprises a second plurality of output units, the input data based upon second outputs at the second plurality of output units.

6. The computing device of claim 5, the T-DSN further comprises:
a second hidden layer that comprises:
a third set of hidden units that comprises a third plurality of hidden units; and
a fourth set of hidden units that comprises a fourth plurality of hidden units; and
a second weight tensor that maps the second hidden layer to the second output layer.

7. The computing device of claim 6, the second weight tensor defines second respective weights between:
a product of each pair of hidden units formed between the third plurality of hidden units and the fourth plurality of hidden units, such that each pair of hidden units comprises a hidden unit in the third plurality of hidden units and a hidden unit in the fourth plurality of hidden units; and
each output unit in the second output units, wherein second outputs at the output units are based upon the respective weights defined by the second weight tensor and input data, and the processor is further configured to perform the classification task based upon the second outputs at the second output units.

8. The computing device of claim of claim 7, the input data is based upon the second outputs.

9. The computing device of claim 8, the input data is the second outputs.

10. The computing device of claim 1, a number of hidden units in the first set of hidden units is equal to a number of hidden units in the second set of hidden units.

11. The computing device of claim 1, a number of hidden units in the first set of hidden units is between 50 and 100 hidden units, and a number of hidden units in the second set of hidden units is between 50 and 100 hidden units.

12. The computing device of claim 1, the classification task being speech recognition.

13. A method for recognizing speech comprising:
providing a tensor deep stacked neural network (T-DSN), wherein the T-DSN comprises:
a hidden layer that comprises:
a first set of hidden units; and
a second set of hidden units;
an output layer that comprises a plurality of output units; and
a weight tensor that maps the hidden layer to the output layer by defining weights between:
products of pairs of hidden units, each pair in the pairs comprises a hidden unit from the first set of hidden units and a hidden unit from the second set of hidden units; and
the output units;
receiving input data at the T-DSN;
generating outputs at the output units based upon the input data and the weights defined by the weight tensor; and
recognizing the speech based upon the outputs at the output units.

14. The method of claim 13, the weight tensor defines a respective weight between:
each pair of hidden units formable between the first set of hidden units and the second set of hidden units; and
each output unit in the output units, such that each output unit has a number of weights corresponding thereto that is equivalent to a number of pairs of hidden units formable between the first set of hidden units and the second set of hidden units.

15. The method of claim 13, wherein generating the outputs at the output units comprises computing the products of the pairs of hidden units.

16. The method of claim 15, wherein computing the products of the pairs of hidden units comprises computing the products of the pairs of hidden units as Khatri-Rao products.

17. The method of claim 13, the T-DSN further comprises:
an input layer that represents the input data as a vector, the vector comprises entries; and
at least one weight matrix that maps the input layer to the hidden layer.

18. The method of claim 17, the at least one matrix comprises:
a first weight matrix that maps the entries of the vector to the first plurality of hidden units; and
a second weight matrix that maps the entries of the vector to the second plurality of hidden units.

19. The method of claim 18, the first weight matrix defines a respective weight between each entry of the vector and each hidden unit in the first plurality of hidden units, and the second weight matrix defines a respective weight between each entry of the vector and each hidden unit in the second plurality of hidden units.

20. A computer-readable storage medium comprising instructions that, when executed by at least one processor, cause the at least one processor to perform acts comprising:
receiving input data at a tensor deep stacked neural network (T-DSN), wherein the T-DSN comprises:
a hidden layer that comprises:
a first set of hidden units; and
a second set of hidden units;
an output layer that comprises a plurality of output units; and
a weight tensor that maps the hidden layer to the output layer by defining weights between:
products of pairs of hidden units, each pair in the pairs comprises a hidden unit from the first set of hidden units and a hidden unit from the second set of hidden units; and
the output units;
generating outputs at the output units based upon the input data and the weights defined by the weight tensor; and
recognizing speech based upon the outputs at the output units.

* * * * *